(12) United States Patent
Shen et al.

(10) Patent No.: US 11,615,519 B2
(45) Date of Patent: Mar. 28, 2023

(54) METHOD AND APPARATUS FOR IDENTIFYING CONCRETE CRACK BASED ON VIDEO SEMANTIC SEGMENTATION TECHNOLOGY

(71) Applicant: Zhejiang University, Hangzhou (CN)

(72) Inventors: Yonggang Shen, Hangzhou (CN); Zhenwei Yu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 181 days.

(21) Appl. No.: 17/142,701

(22) Filed: Jan. 6, 2021

(65) Prior Publication Data

US 2021/0319547 A1 Oct. 14, 2021

(51) Int. Cl.
*G06T 7/00* (2017.01)
*G06T 7/10* (2017.01)
*G06N 3/08* (2023.01)
*G06V 20/40* (2022.01)

(52) U.S. Cl.
CPC ............. *G06T 7/0004* (2013.01); *G06N 3/08* (2013.01); *G06T 7/10* (2017.01); *G06V 20/41* (2022.01); *G06T 2207/20081* (2013.01); *G06T 2207/20084* (2013.01); *G06T 2207/30132* (2013.01)

(58) Field of Classification Search
CPC ..................... G06T 7/0004; G06T 7/10; G06T 2207/20081; G06T 2207/20084; G06T 2207/30132; G06T 7/11; G06T 2207/10016; G06T 7/0008; G06N 3/08; G06N 3/0454; G06V 20/41; G06V 10/82; G06V 20/49

See application file for complete search history.

(56) References Cited

U.S. PATENT DOCUMENTS

| 11,341,410 | B1 * | 5/2022 | Johnson | G06N 5/02 |
| 2018/0075168 | A1 * | 3/2018 | Tiwari | G06T 3/0068 |
| 2019/0180433 | A1 * | 6/2019 | Sasson | G06T 7/001 |
| 2019/0206044 | A1 * | 7/2019 | Marra | G01C 21/20 |

* cited by examiner

*Primary Examiner* — Ping Y Hsieh
(74) *Attorney, Agent, or Firm* — Daniel J. Chalker; Edwin S. Flores; Chalker Flores, LLP (57) ABSTRACT

A method and apparatus for identifying a concrete crack includes: obtaining a crack video, and manually annotating a video image frame by using a label; predicting a future frame and label for the annotated frame by using a spatial displacement convolutional block, propagating the future frame and label, to obtain a synthetic sample, and preprocessing the synthetic sample, to form a crack database; modifying input and output ports of data of a deep learning model for video semantic image segmentation and a parameter, to enable the deep learning model to accept video input, and establishing a concrete crack detection model based on the video output; using a convolutional layer in a trained deep learning model as an initial weight of the concrete crack detection model for migration; inputting the crack database into a migrated concrete crack detection model, and training the concrete crack detection model for crack data.

18 Claims, 5 Drawing Sheets

METHOD AND APPARATUS FOR IDENTIFYING CONCRETE CRACK BASED ON VIDEO SEMANTIC SEGMENTATION TECHNOLOGY

CROSS-REFERENCE TO RELATED APPLICATIONS

This application claims priority to China Application Serial No. 202010269508.7, filed Apr. 8, 2020, the entire contents of which are incorporated herein by reference.

TECHNICAL FIELD OF THE INVENTION

The disclosure belongs to the field of technologies for detecting damage to a concrete structure, and in particular, to a method and an apparatus for identifying a concrete crack based on a video semantic segmentation technology.

BACKGROUND OF THE INVENTION

Currently, as the most commonly used building material, concrete is widely used in infrastructure construction, such as roads, bridges, tunnels, and industrial and civil construction. Damage to a surface of a concrete structure, including cracks, weathering, holes, exfoliation, and the like, directly reflects the durability and safety of the concrete structure. Cracks are a type of damage that causes the severest damage to the structure and attracts the most attention. Therefore, regular crack detection plays a key role in infrastructure maintenance and operations. According to features such as a shape and a location of a crack, a degree of damage inside the structure and deterioration reasons may be inferred, which provides reasonable guidance for a structure health monitoring.

Manual crack detection is conventionally used, which requires maintenance personnel to be equipped with certain equipment to conduct on-site investigation, marking, and measurement, and to record detection results. Traditional manual visual detection methods have a low efficiency, high costs, and frequent misses, and are gradually replaced by machine learning methods that combine non-contact image acquisition and computer vision analysis. For example, when a prestressed concrete box girder bridge with a span of 100 m is manually detected, an engineer needs to take at least six hours to make an original scene record by using a steel tape, a camera, a crack width and depth detector, and other tools and by renting an expensive bridge detection vehicle when traffic is temporarily closed, and then draws a schematic diagram of crack distribution of the entire bridge by using a drawing tool such as the CAD. By using the machine learning method, full-coverage photos of a bridge surface are taken by using advanced equipment such as a drone or a wall-climbing robot with a high-definition camera, and the crack is identified and located by using an advanced algorithm. Because of advantages of comprehensive disease investigation and true and reliable information, the machine learning method is attracting attention from and being researched by scholars. To ensure the definition of a crack image, an actual size of the bridge in each image generally does not exceed 4 $m^2$. If the outer surface of 100 m span box girder is about 4000 $m^2$, and the photo overlap rate is calculated as 20%, the drone needs to take more than two hours to acquire at least 1500 images. Although there is no need to close the traffic, but the image acquisition efficiency is not high. Compared with images collection, video recording only needs to scan the surface of the object once with the camera, thereby eliminating a repeated focusing process. Therefore, acquisition of video data is faster than that of images. In addition, video shooting is real-time. After advanced computer hardware facilities are matched, video shooting can be performed to monitor operation of infrastructure such as bridges.

Methods based on computer vision have been widely applied to identification of crack images. Machine learning theories allow computers to simulate human learning behaviors and acquire new knowledge or skills by designing some algorithms. The sub-category of machine learning-deep learning method is not affected by external interference, and can process a large number of image data to improve its performance, thereby showing great potential in fracture identification. However, such a method usually based on a deep convolutional neural network (CNN) only detects cracks at an image level and grid unit level. A result given in a form of a rectangular classification box contains some redundant pixels, and therefore, is not accurate enough. Cracks are small targets, and account for a very small proportion of pixels in the rectangular box. In this case, most of the pixels are redundant. Moreover, a general CNN model performs detection by using a sliding window. Such a method inevitably produces a large quantity of redundant windows. Therefore, some scholars have proposed a convolutional neural network Faster-RCNN based on a region proposal network, thereby avoiding using the sliding window technology. However, the Faster-RCNN still detects cracks at a grid unit level, that is, an image is segmented into smaller image blocks during detection. Consequently, a complete feature of a target is damaged.

Each pixel may be classified by using a semantic segmentation technology, different targets and locations in an image are identified at a pixel level, and a classification result is represented by using different color masks without losing target space information, so that a crack and the background are completely separated. A feature of the image is understood at a pixel level, so that semantic segmentation requires less training samples. Although a manually added polygon label is at an image level, each annotated pixel in the label may be used as a training sample of a semantic segmentation model. Consequently, training samples are increased by hundreds to thousands of times. In fact, a semantic segmentation result is closer to an observation of the world by human eyes, because an object boundary of the world in the human eyes is clear, rather than the object being contained in a larger rectangular box. However, costs of image annotation during semantic segmentation are too high. For example, in a Cityscapes data set, it takes an average of 1.5 hours to annotate all pixels of an image with a resolution of 1024×2048. It still takes an average of 7 minutes to roughly annotate an image.

Because many semantic segmentation data sets are obtained by selecting images at a certain interval for annotation in a continuous video frame sequence, if a label can be propagated from an annotated frame to an unannotated frame by using a method, a large quantity of synthetic data can be obtained. Many scholars use an optical flow method to propagate such labels. Movement of objects and impact of movement on visibility and an appearance of surrounding objects can be accurately captured by using the method, and future frames can be predicted from past frame sequences. However, an optical flow vector of an object newly appeared in a current frame cannot be correctly estimated by using the optical flow method, causing distortion of an image in a predicted frame. Although a large quantity of synthetic data can be obtained to effectively reduce sample costs of semantic segmentation, and a segmentation result have time information that does not exist in a static image, invalid and wrong synthetic samples limit prediction accuracy of the semantic segmentation model and limit video prediction development.

In summary, the existing technology has the following problems: Establishment of a deep learning model with excellent prediction accuracy usually requires massive data, which is too costly; the traditional CNN model has too much redundant information in prediction results; the optical flow vector of the object newly appeared in the current frame cannot be estimated by using the optical flow technology, and a synthetic sample may be invalid.

Difficulty of resolving the above technical problems: Time costs of data annotation for semantic segmentation are too high; a quantity of samples may be increased by using the optical flow method, but the accuracy of synthetic samples is not high, and image distortion needs to be corrected; the existing semantic segmentation model can only accept image input.

Significance of resolving the above technical problems: Time costs of semantic segmentation are reduced, a large quantity of synthetic samples can be obtained with limited data sets, the accuracy of the synthetic samples is high, the synthetic samples can be used for training the semantic segmentation model, and the model can further accept video input. Therefore, applicability is wider.

SUMMARY

An objective of the disclosure is to provide a method and an apparatus for identifying a concrete crack based on a video semantic segmentation technology, to resolve problems that a current commonly used exhaustive deep learning convolutional neural network (CNN) method requires a large quantity of data, and has high computational costs, low detection efficiency, and poor timeliness.

To achieve the above purpose, the disclosure provides a computer-implemented method for identifying a concrete crack based on a video semantic segmentation technology, including the following steps:

obtaining a crack video, saving each frame of the crack video, selecting a frame at a predetermined interval, and manually annotating the frame as a manually annotated sample;

predicting a future frame and a future label for the annotated frame by using a spatial displacement convolutional block, and propagating the future frame and the future label, to obtain a synthetic sample;

preprocessing the synthetic sample and the manually annotated sample, to form a crack database;

modifying input and output ports of data of a deep learning model for video semantic image segmentation, such as Deeplabv3+, and a parameter, to enable the deep learning model for video semantic image segmentation to accept video input, and establishing a concrete crack detection semantic segmentation model, such as a CrackVideoNet (CVN) model, based on the video output; using a convolutional layer in a trained deep learning model for video semantic image segmentation network as an initial weight of the concrete crack detection semantic segmentation model for migration; and inputting the crack database into a migrated concrete crack detection semantic segmentation model, and training the concrete crack detection semantic segmentation model for crack data, and identifying the concrete crack by using the concrete crack detection semantic segmentation model.

Further, during manual annotation, the crack in the image is annotated by using an image annotation software, such as Labelme.

Further, an object in the future frame is predicted based on a current frame and a past frame in the crack video by using the spatial displacement convolutional block.

Further, when the future frame and the future label are propagated, propagation is performed forward or backward from an original frame.

Further, the future frame and the future label are predicted by using the spatial displacement convolutional block, where coordinates $F_{t+1}(x, y)$ and $M_{t+1}(x, y)$ of any point in the future frame and the future label are as follows:

$$F_{t+1}(x,y)=K(x,y)D_{F_t}(x+u,y+v);$$

$$M_{t+1}(x,y)=K(x,y)D_{M_t}(x+u,y+v);$$

$$(u,v)=C(I_{1:t}); \text{ and}$$

wherein: (x, y) are coordinates of any pixel in a frame, C is a three-dimensional CNN used to predict a motion vector (u, v) based on input frames $F_1$ to $F_t$, $K(x, y) \in R_{N \times N}$ is an N×N two-dimensional kernel predicted by C at (x, y), and $D_{F_t}(x+u, y+v)$ and $D_{M_t}(x+u, y+v)$ are N×N two-dimensional kernels centered on (x+u, y+v) in $F_t$ and $M_t$.

Further, the preprocessing includes operations of crack data enhancement and image normalization.

Further, the modifying input and output ports of data of the deep learning model for video semantic image segmentation includes operations of segmenting the crack video into images, predicting the images, and stitching the images into a video after the prediction is completed, and the modifying a parameter includes a quantity of training categories, a cutting size of a training image, a training batch size, a learning rate, and a registration crack data set.

Further, the deep learning model for video semantic image segmentation network is pre-trained on a large-scale data set, such as Cityscapes (website: cityscapes-dataset.com).

Further, the crack data enhancement includes random rotation, cutting, and flipping.

In a second aspect, the disclosure provides an apparatus for identifying a concrete crack based on a video semantic segmentation technology, including:

an obtaining module, configured obtain a crack video, save each frame of the crack video, select a frame at a predetermined interval, and manually annotate the frame as a manually annotated sample;

a synthesizing module, configured to predict a future frame and a future label for the annotated frame by using a spatial displacement convolutional block, and propagate the future frame and the future label, to obtain a synthetic sample;

a preprocessing module, configured to preprocess the synthetic sample and the manually annotated sample, to form a crack database;

a model establishment module, configured to modify input and output ports of data of a deep learning model for video semantic image segmentation, such as Deeplabv3+, and a parameter, to enable the deep learning model for video semantic image segmentation to accept video input, and establish a concrete crack detection semantic segmentation model based on the video output;

a migration module, configured to use a convolutional layer in a trained deep learning model for video semantic image segmentation+network as an initial weight of the concrete crack detection semantic segmentation model for migration; and a training identification module, configured to input the crack database into a migrated concrete crack detection semantic segmentation model, and train a concrete crack detection semantic segmentation model for crack data, and identify the concrete crack by using the concrete crack detection semantic segmentation model.

Based on the foregoing technical solutions, in the embodiments of the disclosure, crack video data is preprocessed based on a video frame sequence, a future label and a future frame are jointly propagated by using a spatial displacement convolutional block, to obtain a large quantity of synthetic samples to form a data set; a weight of a convolutional layer in a trained deep learning model for video semantic image segmentation network is used as an initial training weight of a concrete crack detection semantic segmentation model for training prediction, to obtain a crack detection model; input and output ports of data of a deep learning model for video semantic image segmentation and a parameter are modified, to form an end-to-end crack detection model based on video input and video output.

A well-performing deep learning CNN model generally requires tens of thousands to hundreds of thousands, or even millions of pieces of data, and required data can be effectively reduced by using the semantic segmentation technology. An increase in a data volume helps to increase prediction accuracy. However, even for a relatively small data set, the semantic segmentation model may also obtain a very high mIoU value. Compared with the CNN, dependence of the model on the data set is greatly reduced, and the required data volume is one-tenth or even one-hundredth of a data volume required by the CNN. Based on the disclosure, a problem that the concrete crack deep learning CNN model requires a large quantity of data is resolved. The semantic segmentation model in the disclosure is based on an initial weight that has been pre-trained, and the network converges faster. In addition, compared with the CNN, a semantic segmentation result is more accurate and more intuitive, and relatively strong robustness and generalization can be obtained in a case of limited data sets.

BRIEF DESCRIPTION OF THE DRAWINGS

The accompanying drawings described herein are provided for further understanding of the disclosure, and constitute a part of the disclosure. The exemplary examples and illustrations of the disclosure are intended to explain the disclosure, but do not constitute inappropriate limitations to the disclosure. In the accompanying drawings.

DETAILED DESCRIPTION OF THE INVENTION

To make the objectives, the technical solutions, and advantages of the disclosure clearer and more comprehensible, the disclosure is described in further detail below with reference to the concrete crack examples. It should be understood that the specific examples described herein are merely intended to explain the disclosure, rather than to limit the disclosure.

For a current commonly used exhaustive deep learning convolutional neural network (CNN) method, a large quantity of data is required, computational costs are high, detection efficiency is low, and timeliness is poor. The disclosure is a method that can greatly reduce data required by a concrete crack deep learning model, and can greatly improve detection efficiency and timeliness. The method has strong robustness, a good generalization capability, and a crack detection technology with relatively high detection efficiency and accuracy. Moreover, the method is original and more suitable for engineering applications.

The application principle of the disclosure is described in detail below with reference to the accompanying drawings.

Figure 1:
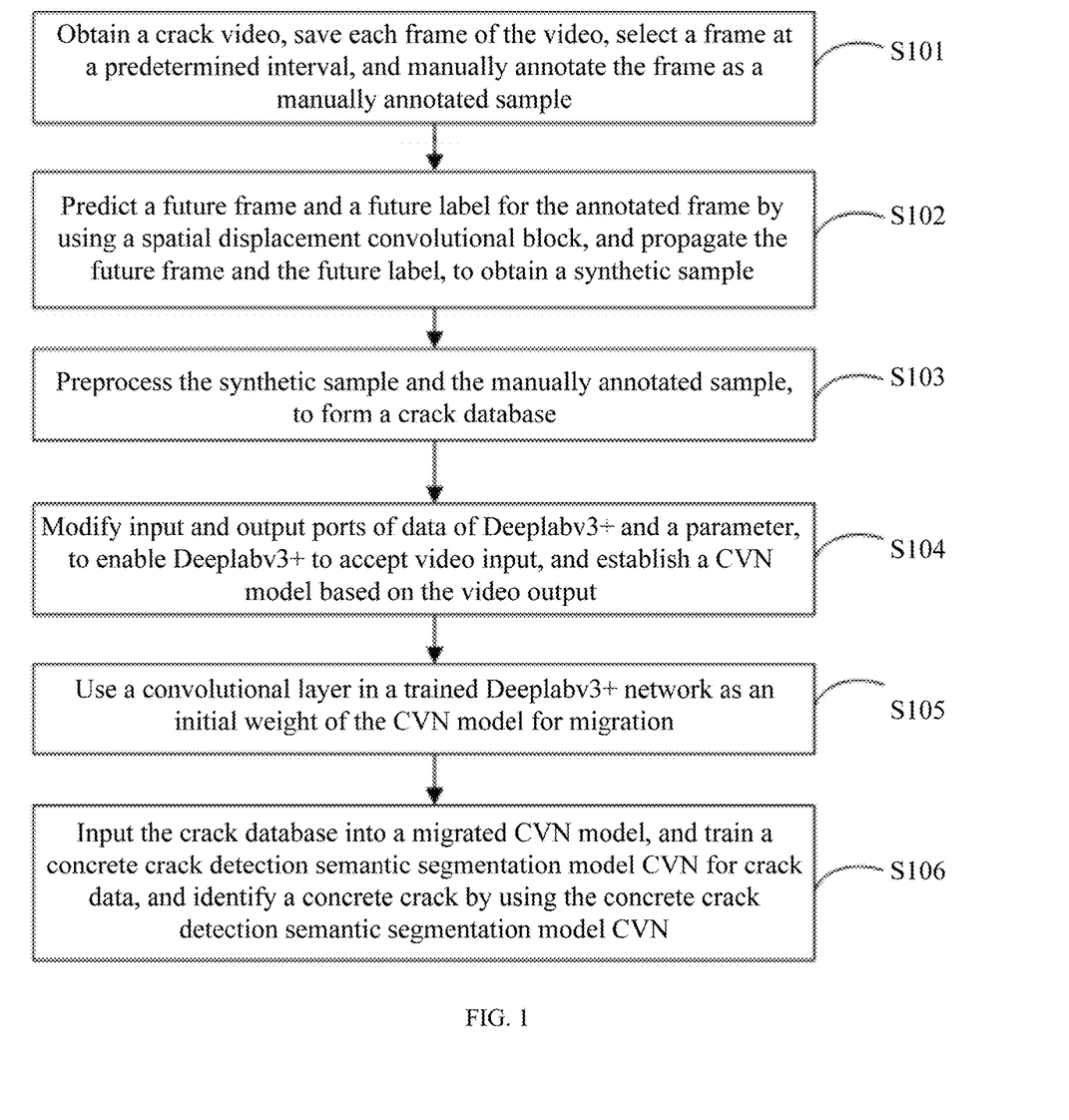
FIG. 1 is a flowchart of a computer-implemented method for identifying a concrete crack based on a video semantic segmentation technology according to an embodiment of the disclosure.
Figure 2:
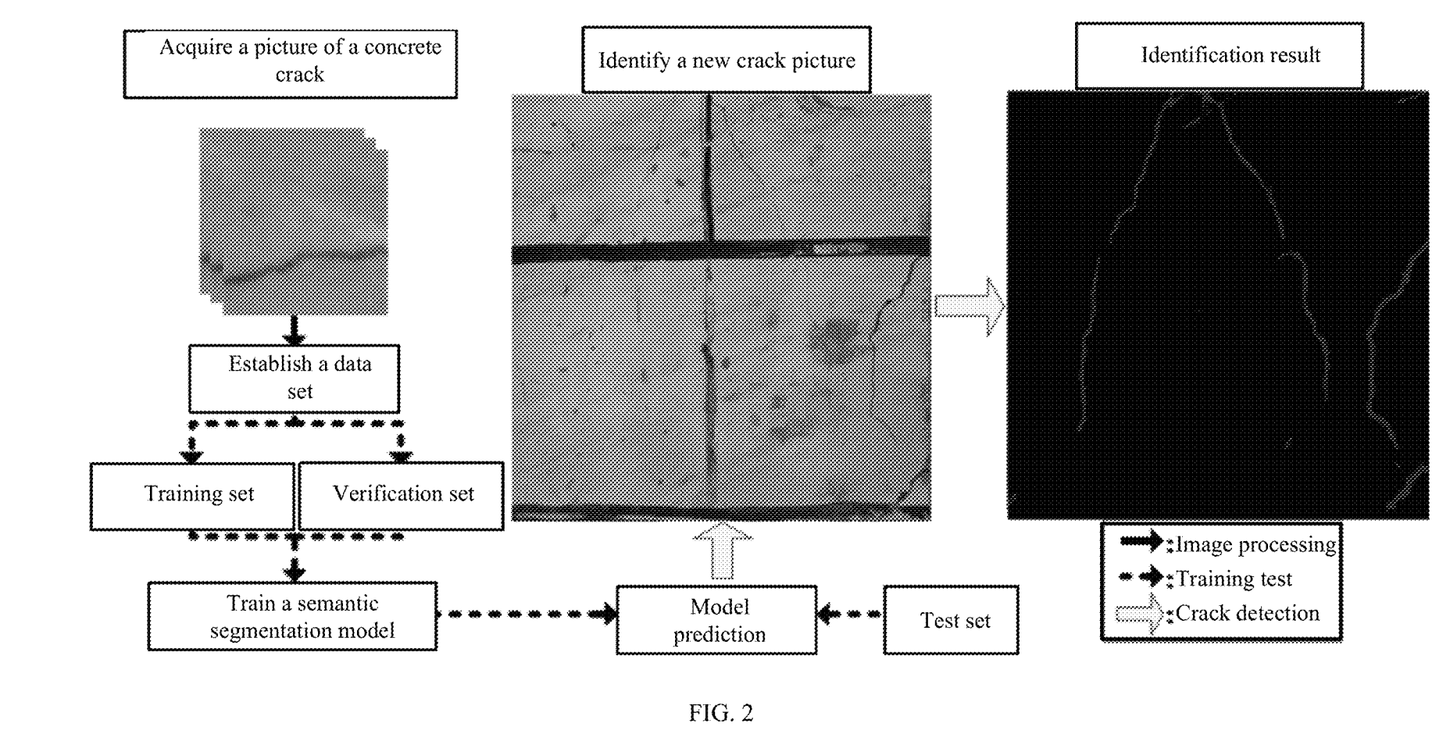
FIG. 2 is a visual flowchart of a computer-implemented method for identifying a concrete crack based on a video semantic segmentation technology according to an embodiment of the disclosure.

FIG. 1 is a flowchart of a computer-implemented method for identifying a concrete crack based on a video semantic segmentation technology according to an embodiment of the disclosure. FIG. 2 is a visual flowchart of a computer-implemented method for identifying a concrete crack based on a video semantic segmentation technology according to an embodiment of the disclosure. An embodiment of the disclosure provides a method for identifying a concrete crack based on a video semantic segmentation technology, including the following steps:

Step S101. Obtain a crack video, save each frame of the crack video, select a frame at a predetermined interval, and manually annotate the frame as a manually annotated sample.

Specifically, in a destructive experiment of a concrete beam, cracks that gradually appeared on a surface of the beam were photographed. To ensure that a trained model has better robustness and stability, development directions and definition of the cracks are different. There are still stains, template traces, instrument wiring, and other interference on the surface of a structural background where the cracks are located. In this example, specifications of two videos obtained through video shooting are 1920×1080, a frame rate is 25, and duration is uniformly approximately 2 minutes and 30 seconds. Each frame of the video is saved, and a total of 7,187 images are obtained. A crack in an original image is manually annotated by using an image annotation tool, such as Labelme (website: labelme2.csail.mit.edu/Release3.0/index.php). The 20$^{th}$ frame per second is used as a manually annotated sample, and annotation is performed once per second, to obtain a total of 286 annotated frames.

Step S102. Predict a future frame and a future label for the annotated frame by using a spatial displacement convolutional block, and propagate the future frame and the future label, to obtain a synthetic sample.

Specifically, the future frame and the future label are predicted by using the spatial displacement convolutional block, where coordinates $F_{t+1}(x, y)$ and $M_{t+1}(x, y)$ of any point in the future frame and the future label are as follows:

$$F_{t+1}(x,y)=K(x,y)D_{F_t}(x+u,y+v);$$

$$M_{t+1}(x,y)=K(x,y)D_{M_t}(x+u,y+v);$$

$$(u,v)=C(I_{1:t}); \text{ and}$$

wherein: (x, y) are coordinates of any pixel in a frame, C is a three-dimensional CNN used to predict a motion vector (u, v) based on input frames $F_1$ to $F_t$, $K(x, y) \in R^{N \times N}$ is an N×N two-dimensional kernel predicted by C at (x, y), and $D_{F_t}(x+u, y+v)$ and $D_{M_t}(x+u, y+v)$ are N×N two-dimensional kernels centered on (x+u, y+v) in $F_t$ and $M_t$.

The future frame and the future label are predicted and propagated for the annotated frame by using the spatial displacement convolutional block, a quantity of propagated frames is set to ±3, that is, 6 synthetic samples are obtained from 1 real sample, and a total of 2002 training samples are obtained.

Step S103. Preprocess the synthetic sample and the manually annotated sample, to form a crack database.

Specifically, operations of concrete crack data enhancement (random rotation, cutting, flipping, and the like) and image normalization are performed by using the samples as the crack database, and samples are randomly selected therefrom as a training set, a verification set, and a test set.

Step S104. Modify input and output ports of data of a deep learning model for video semantic image segmentation, such as Deeplabv3+, and a parameter, to enable the deep learning model for video semantic image segmentation to accept video input, and establish a concrete crack detection semantic segmentation model, such as a CrackVideoNet (CVN) model, based on the video output.

Specifically, the input and output ports of the data of the deep learning model for video semantic image segmentation are modified, to enable the deep learning model for video semantic image segmentation to adapt to the video input and output, and a semantic segmentation result is attached to an output part to obtain an end-to-end prediction result. A quantity of categories, a cutting size of a training image, a training batch size, a learning rate, a registration of crack data set are modified, and a concrete crack detection semantic segmentation model is established.

Step S105. Use a convolutional layer in a trained deep learning model for video semantic image segmentation network as an initial weight of the concrete crack detection semantic segmentation model for migration.

Specifically, a weight of the convolutional layer in the deep learning model for video semantic image segmentation network trained on a large-scale data set, such as Cityscapes, is migrated as a prediction basis of the concrete crack detection semantic segmentation model.

Step S106. Input the crack database into a migrated concrete crack detection semantic segmentation model, and train a concrete crack detection semantic segmentation model for crack data, and identify the concrete crack by using the concrete crack detection semantic segmentation model.

Specifically, the concrete crack detection semantic segmentation model is trained on the crack database, to obtain a video semantic segmentation model for crack data.

Figure 3:
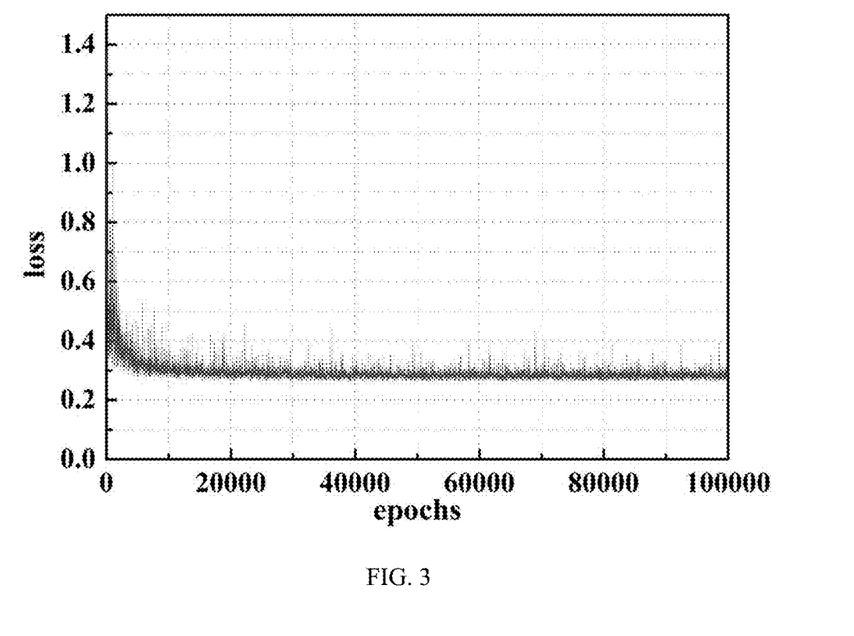
FIG. 3 is a curve of losses on a crack image training set in an experiment according to an embodiment of the disclosure.
Figure 5:
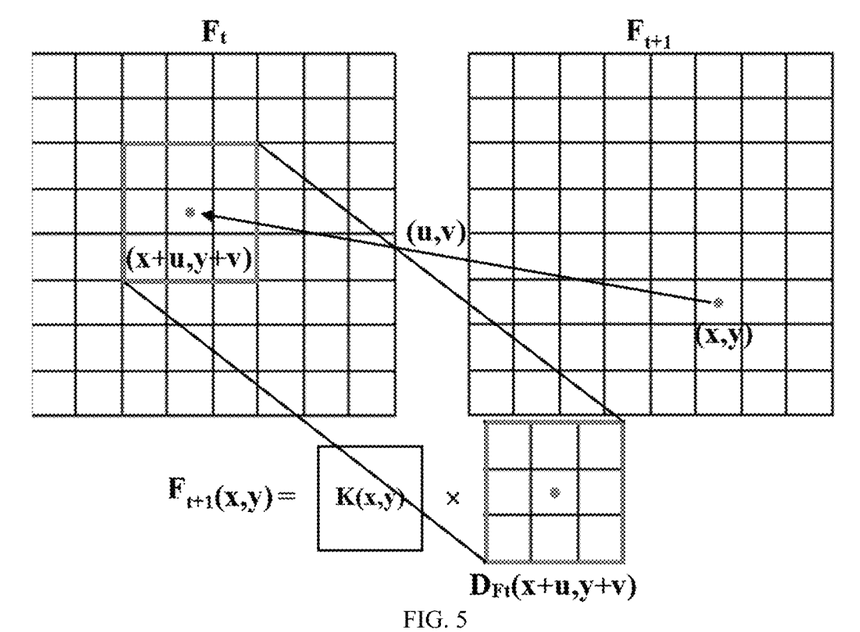
FIG. 5 is a process of predicting a future frame by using a spatial displacement convolutional block according to the disclosure.
Figure 6:
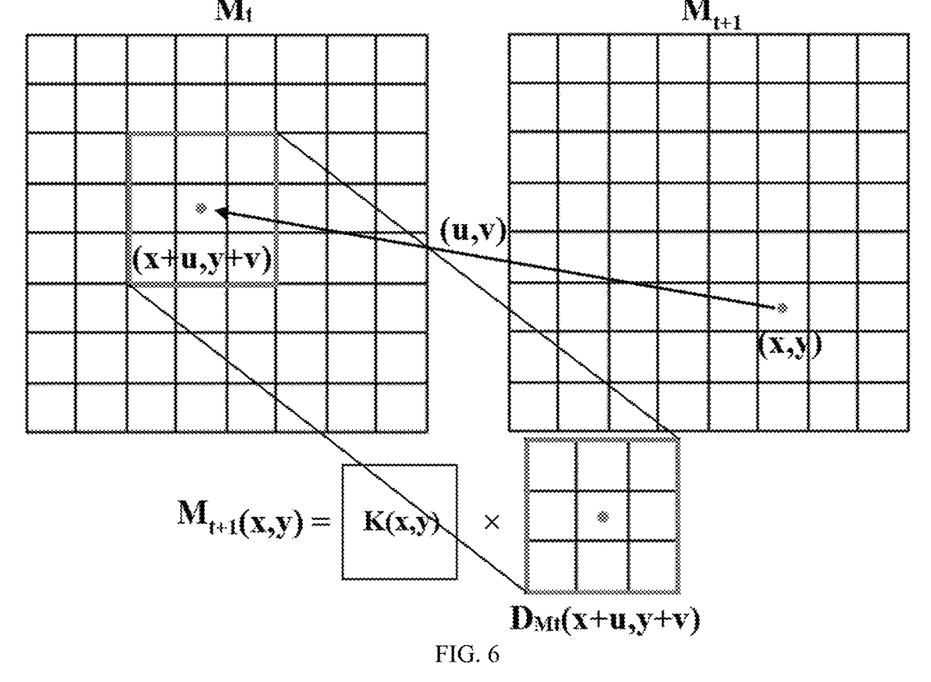
FIG. 6 is a process of predicting a future label by using a spatial displacement convolutional block according to the disclosure.

In this example, two photographic videos of destructive experiments on a concrete beam were used as training data, and the other video was used as data for a second test. A diagram of predicting a future frame when training samples are synthesized is shown in FIG. 5. Any pixel (x, y) in a frame $F_{t+1}$ is a weighted sample of an N×N region pixel block $D_{F_t}(X+u, y+v)$ centered on (x+u, y+v) in a frame $F_t$. A diagram of predicting a future label is shown in FIG. 6. Any pixel (x, y) in a frame $M_{t+1}$ is a weighted sample of an N×N region pixel block $D_{M_t}(x+u, y+v)$ centered on (x+u, y+v) in a frame $M_t$. A curve of losses during training is shown in FIG. 3. A quantity of training steps is set to 100,000 during training, and an average loss value for every 10 steps is recorded. It may be seen from the figure that a training loss rapidly decreases from initial 1.37 to less than 0.3 within 10,000 steps, and oscillates until the end of the training. This is because a data set contains only one category of objects, and model learning is relatively fast and accurate.

Figure 4:
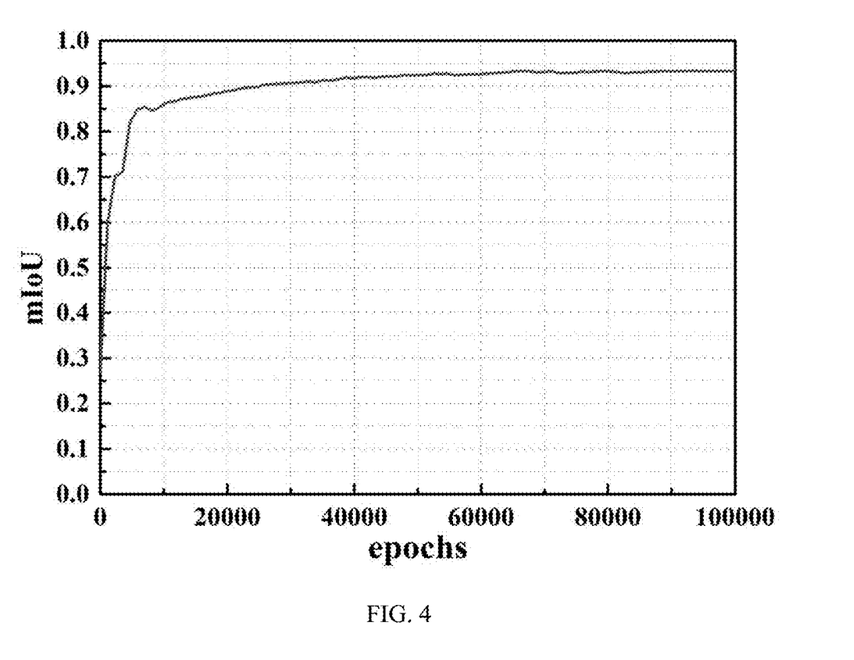
FIG. 4 is an mIoU curve on a crack image verification set in an experiment according to an embodiment of the disclosure.

An mIoU curve of the verification set is shown in FIG. 4. Due to migration learning, the mIoU curve does not start to grow from 0 at the $0^{th}$ iteration, but has an initial value of about 0.269. A growth trend of the mIoU curve corresponds to the curve of losses, rising rapidly to a higher level within 10,000 steps, then slowly increasing, and finally stabilizing at 0.93.

Figure 7:
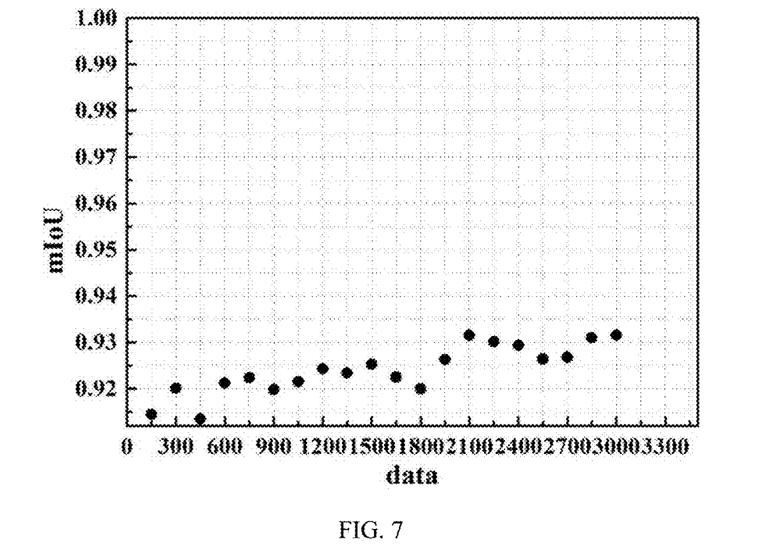
FIG. 7 is a diagram of a curve relationship between a data volume imported into a model and an mIoU value of the model according to the disclosure.

A well-performing deep learning model generally requires tens of thousands to hundreds of thousands, or even millions of pieces of data, and required data may be effectively reduced by using the semantic segmentation technology. To explore a relationship between a data volume imported into the model and model identification accuracy in the disclosure, a data set including 150 to 3000 images with a pixel resolution of 1920×1080 was further studied. A test result is shown in FIG. 7. Training and verification parameters of each group are set to be consistent. Except that data enhancement is not performed, other parameters are the same. It may be seen from the image that as the data set becomes larger, an average intersection over union of the verification set rises more slowly than mIoU, and finally stabilizes at 0.93. The result shows that an increase in the data volume helps to increase prediction accuracy. However, even for a relatively small data set, the semantic segmentation model may also obtain a high mIoU value. Compared with the CNN, dependence of the model on the data set is greatly reduced, and the data volume is one-tenth or even one-hundredth of a data volume required by the CNN. Based on the disclosure, a problem that the concrete crack deep learning CNN model requires a large quantity of data is resolved. The semantic segmentation model in the disclosure is based on an initial weight that has been pre-trained, and the network converges faster. In addition, compared with the CNN, the semantic segmentation result is more accurate and more intuitive, and relatively strong robustness and generalization can be obtained in a case of limited data sets.

The semantic segmentation model in the disclosure is based on an initial weight that has been pre-trained, can obtain relatively strong robustness and generalization in a case of limited data sets, and is more suitable for an engineering environment.

Figure 8:
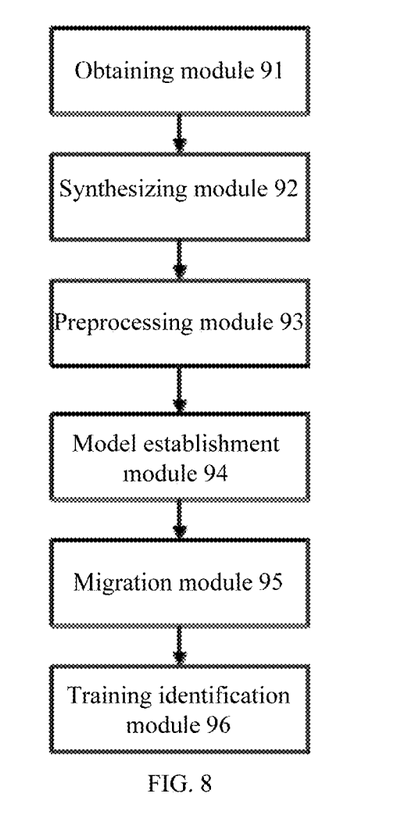
FIG. 8 is a block diagram of an apparatus for identifying a concrete crack based on a video semantic segmentation technology according to an embodiment of the disclosure.

FIG. 8 is a schematic structural diagram of an apparatus for identifying a concrete crack based on a video semantic segmentation technology according to an embodiment of the disclosure. The apparatus may execute a method for identifying a concrete crack based on a video semantic segmentation technology according to any embodiment of the disclosure, and has a corresponding function module for performing the method and beneficial effects. As shown in FIG. 8, the apparatus includes:

an obtaining module 91, configured obtain a crack video, save each frame of the crack video, select a frame at a predetermined interval, and manually annotate the frame as a manually annotated sample;

a synthesizing module 92, configured to predict a future frame and a future label for the annotated frame by using a spatial displacement convolutional block, and propagate the future frame and the future label, to obtain a synthetic sample;

a preprocessing module 93, configured to preprocess the synthetic sample and the manually annotated sample, to form a crack database;

a model establishment module 94, configured to modify input and output ports of data of a deep learning model for video semantic image segmentation, such as Deeplabv3+, and a parameter, to enable the deep learning model for video semantic image segmentation to accept video input, and establish a concrete crack detection semantic segmentation model based on the video output;

a migration module 95, configured to use a convolutional layer in a trained deep learning model for video semantic image segmentation network as an initial weight of the concrete crack detection semantic segmentation model for migration; and a training identification module 96, configured to input the crack database into a migrated concrete crack detection semantic segmentation model, and train a concrete crack detection semantic segmentation model for crack data, and identify the concrete crack by using the concrete crack detection semantic segmentation model.

The sequence numbers of the foregoing examples of the disclosure are merely for the purpose of description and do not represent advantages and disadvantages of the examples.

In the above examples of the disclosure, the description of the examples each has a focus, and portions not described in detail in one example may refer to the description of other examples.

In several examples provided herein, it should be understood that the disclosed technical content may be implemented in other manners. For example, the described device example is merely an example. For example, the unit division may be merely logical function division and may be other division in actual implementation. For example, a plurality of units or components may be combined or integrated into another system, or some features may be ignored or not performed. In other respects, the intercoupling or direct coupling or communication connection shown or discussed may be indirect coupling or communication connection through some interfaces, units, or modules, or may be implemented in an electrical or other forms.

The units described as separate parts may or may not be physically separate. Parts displayed as units may or may not be physical units, which may be located in one position, or may be distributed on a plurality of units. Some or all of the units may be selected according to actual needs to achieve the objectives of the solutions of the examples.

In addition, functional units in the examples of the disclosure may be integrated into one processing unit, or each of the units may exist alone physically, or two or more units are integrated into one unit. The foregoing integrated unit can be implemented either in the form of hardware or in the form of software functional units.

The integrated unit, if implemented in the form of a software functional unit and sold or used as a stand-alone product, may be stored in a computer-readable storage medium. Based on such understanding, the technical solution of the disclosure which is essential or a part contributing to the prior art or all or a part of the technical solution may be embodied in the form of a software product. The computer software product is stored in a storage medium and includes a plurality of instructions for enabling a computer device (which may be a personal computer (PC), a server, or a network device) to execute all or some steps of the method according to each example of the disclosure. The storage medium has the computer software product stored therein includes: a USB flash disk, a read-only memory (ROM), a random access memory (RAM), a mobile hard disk, a magnetic disk, an optical disk, or other media capable of storing program codes.

The above descriptions are merely preferred examples of the disclosure, and are not intended to limit the disclosure. Any modification, equivalent substitute and improvement without departing from the spirit and principle of the disclosure shall be included within the protection scope of the disclosure.

What is claimed is:

1. A computer-implemented method for identifying a concrete crack based on a video semantic segmentation technology, comprising the following steps:

obtaining a crack video, saving each frame of the crack video, selecting a frame at a predetermined interval, and manually annotating the frame as a manually annotated sample;

predicting a future frame and a future label for the annotated frame by using a spatial displacement convolutional block, and propagating the future frame and the future label, to obtain a synthetic sample;

preprocessing the synthetic sample and the manually annotated sample, to form a crack database;

modifying input and output ports of data of a deep learning model for video semantic image segmentation and a parameter, to enable the deep learning model for video semantic image segmentation to accept video input, and establishing a concrete crack detection semantic segmentation model based on the video output;

using a convolutional layer in a trained deep learning model for video semantic image segmentation network as an initial weight of the concrete crack detection semantic segmentation model for migration; and inputting the crack database into a migrated concrete crack detection semantic segmentation model, and training the concrete crack detection semantic segmentation model for crack data, and identifying the concrete crack by using the concrete crack detection semantic segmentation model.

2. The computer-implemented method for identifying a concrete crack based on a video semantic segmentation technology according to claim 1, wherein during manual annotation, the crack in the image is annotated by using an image annotation software.

3. The computer-implemented method for identifying a concrete crack based on a video semantic segmentation technology according to claim 1, wherein an object in the future frame is predicted based on a current frame and a past frame in the crack video by using the spatial displacement convolutional block.

4. The computer-implemented method for identifying a concrete crack based on a video semantic segmentation technology according to claim 1, wherein when the future frame and the future label are propagated, propagation is performed forward or backward from an original frame.

5. The computer-implemented method for identifying a concrete crack based on a video semantic segmentation technology according to claim 1, wherein the future frame and the future label are predicted by using the spatial displacement convolutional block, wherein coordinates $F_{t+1}(x, y)$ and $M_{t+1}(x, y)$ of any point in the future frame and the future label comprise:

$$F_{t+1}(x,y)=K(x,y)D_{F_t}(x+u,y+v);$$

$$M_{t+1}(x,y)=K(x,y)D_{M_t}(x+u,y+v);$$

$$(u,v)=C(I_{1:t}); \text{ and}$$

wherein in the formulas, (x, y) are coordinates of any pixel in a frame, C is a three-dimensional CNN used to predict a motion vector (u, v) based on input frames $F_1$ to $F_t$, $K(x, y) \in R^{N \times N}$ is an N×N two-dimensional kernel predicted by C at (x, y), and $D_{F_t}(X\ u, y+v)$ and $D_{M_t}(x+u, y+v)$ are N×N two-dimensional kernels centered on (x+u, y+v) in $F_t$ and $M_t$.

6. The computer-implemented method for identifying a concrete crack based on a video semantic segmentation technology according to claim 1, wherein the preprocessing comprises operations of crack data enhancement and image normalization.

7. The computer-implemented method for identifying a concrete crack based on a video semantic segmentation technology according to claim 1, wherein the modifying input and output ports of data of the deep learning model for video semantic image segmentation comprises operations of segmenting the crack video into images, predicting the images, and stitching the images into a video after the prediction is completed, and the modifying a parameter comprises a quantity of training categories, a cutting size of a training image, a training batch size, a learning rate, and a registration of crack data set.

8. The computer-implemented method for identifying a concrete crack based on a video semantic segmentation technology according to claim 1, wherein the deep learning model for video semantic image segmentation network is pre-trained on the large-scale data set.

9. The computer-implemented method for identifying a concrete crack based on a video semantic segmentation technology according to claim 6, wherein the crack data enhancement comprises random rotation, cutting, and flipping.

10. An apparatus for identifying a concrete crack based on a video semantic segmentation technology, comprising:
    an obtaining module, configured obtain a crack video, save each frame of the crack video, select a frame at a predetermined interval, and manually annotate the frame as a manually annotated sample;
    a synthesizing module, configured to predict a future frame and a future label for the annotated frame by using a spatial displacement convolutional block, and propagate the future frame and the future label, to obtain a synthetic sample;
    a preprocessing module, configured to preprocess the synthetic sample and the manually annotated sample, to form a crack database;
    a model establishment module, configured to modify input and output ports of data of a deep learning model for video semantic image segmentation and a parameter, to enable the deep learning model for video semantic image segmentation to accept video input, and establish a concrete crack detection semantic segmentation model based on the video output;
    a migration module, configured to use a convolutional layer in a trained deep learning model for video semantic image segmentation network as an initial weight of the concrete crack detection semantic segmentation model for migration; and
    a training identification module, configured to input the crack database into a migrated concrete crack detection semantic segmentation model, and train the concrete crack detection semantic segmentation model for crack data, and identify the concrete crack by using the concrete crack detection semantic segmentation model.

11. The apparatus for identifying a concrete crack based on a video semantic segmentation technology according to claim 10, wherein during manual annotation, the crack in the image is annotated by using an image annotation software.

12. The apparatus for identifying a concrete crack based on a video semantic segmentation technology according to claim 10, wherein an object in the future frame is predicted based on a current frame and a past frame in the crack video by using the spatial displacement convolutional block.

13. The apparatus for identifying a concrete crack based on a video semantic segmentation technology according to claim 10, wherein when the future frame and the future label are propagated, propagation is performed forward or backward from an original frame.

14. The apparatus for identifying a concrete crack based on a video semantic segmentation technology according to claim 10, wherein the future frame and the future label are predicted by using the spatial displacement convolutional block, wherein coordinates $F_{t+1}(x, y)$ and $M_{t+1}(x, y)$ of any point in the future frame and the future label comprise:

$$F_{t+1}(x,y)=K(x,y)D_{F_t}(x+u,y+v);$$

$$M_{t+1}(x,y)=K(x,y)D_{M_t}(x+u,y+v);$$

$$(u,v)=C(I_{1:t}); \text{ and}$$

wherein in the formulas, (x, y) are coordinates of any pixel in a frame, C is a three-dimensional CNN used to predict a motion vector (u, v) based on input frames $F_1$ to $F_t$, $K(x, y) \in R^{N \times N}$ is an N×N two-dimensional kernel predicted by C at (x, y), and $D_{F_t}(X+u, y+v)$ and $D_{M_t}(x+u, y+v)$ are N×N two-dimensional kernels centered on (x+u, y+v) in $F_t$ and $M_t$.

15. The apparatus for identifying a concrete crack based on a video semantic segmentation technology according to claim 10, wherein the preprocessing comprises operations of crack data enhancement and image normalization.

16. The apparatus for identifying a concrete crack based on a video semantic segmentation technology according to claim 10, wherein the modifying input and output ports of data of the deep learning model for video semantic image segmentation comprises operations of segmenting the crack video into images, predicting the images, and stitching the images into a video after the prediction is completed, and the modifying a parameter comprises a quantity of training categories, a cutting size of a training image, a training batch size, a learning rate, and a registration of crack data set.

17. The apparatus for identifying a concrete crack based on a video semantic segmentation technology according to claim 10, wherein the deep learning model for video semantic image segmentation network is pre-trained on the large-scale data set.

18. The computerized method for identifying a concrete crack based on a video semantic segmentation technology according to claim 17, wherein the crack data enhancement comprises random rotation, cutting, and flipping.

* * * * *